(12) United States Patent
Dion et al.

(10) Patent No.: US 9,227,267 B1
(45) Date of Patent: Jan. 5, 2016

(54) WARM BOND METHOD FOR BUTT JOINING METAL PARTS

(71) Applicant: William Engineering LLC, Attleboro, MA (US)

(72) Inventors: Paul A. Dion, North Attleboro, MA (US); Gregg A. Dion, North Attleboro, MA (US)

(73) Assignee: William Engineering LLC, North Attleboro, MA (US)

(*) Notice: Subject to any disclaimer, the term of this patent is extended or adjusted under 35 U.S.C. 154(b) by 0 days.

(21) Appl. No.: 14/459,032

(22) Filed: Aug. 13, 2014

(51) Int. Cl.
| | |
|---|---|
| *B23K 20/00* | (2006.01) |
| *B23K 20/04* | (2006.01) |
| *B23K 11/14* | (2006.01) |
| *B23K 20/02* | (2006.01) |
| *B23K 31/02* | (2006.01) |
| *C22C 38/00* | (2006.01) |
| *C22C 38/18* | (2006.01) |
| *B23K 11/02* | (2006.01) |

(52) U.S. Cl.
CPC ............ *B23K 11/14* (2013.01); *B23K 11/02* (2013.01); *B23K 20/023* (2013.01); *B23K 20/028* (2013.01); *B23K 31/02* (2013.01); *C22C 38/00* (2013.01); *C22C 38/18* (2013.01)

(58) Field of Classification Search
CPC .. B23K 20/02; B23K 20/123; B23K 20/1285; B23K 35/004; B29C 65/0672; B29C 66/8322; B29C 66/93451; B21K 25/00
USPC ................................................ 228/227, 228
See application file for complete search history.

(56) References Cited

U.S. PATENT DOCUMENTS

| | | | | |
|---|---|---|---|---|
| 3,212,182 | A * | 10/1965 | Hollander | 228/114 |
| 3,537,171 | A * | 11/1970 | Young et al. | 228/114 |
| 3,937,784 | A * | 2/1976 | Beutner et al. | 423/19 |
| 2011/0132971 | A1 * | 6/2011 | Kolbe et al. | 228/114 |
| 2013/0214075 | A1 * | 8/2013 | Abeln et al. | 241/236 |
| 2014/0050519 | A1 * | 2/2014 | Oiwa et al. | 403/270 |

FOREIGN PATENT DOCUMENTS

| | | | |
|---|---|---|---|
| JP | 2010089157 A | * | 4/2010 |
| WO | WO 8900464 A1 | * | 1/1989 |

OTHER PUBLICATIONS

JP 2010089157 A computer english translation.*

(Continued)

*Primary Examiner* — Erin Saad
(74) *Attorney, Agent, or Firm* — Wilmer Cutler Pickering Hale and Dorr LLP

(57) ABSTRACT

A method of solid phase bonding metal pieces by securing a first and second metal pieces in edge to edge contact; subjecting the first and second metal pieces to a first upset comprising heating the first and second edges to a temperature in the range of 0.35-0.95 of the melting temperature of the first and second metal pieces and applying a first axil force to the first and second metal pieces to urge the first and second edges together, to upset the metal at the edge to edge contact and form a bond; and subjecting the bonded metal piece to a second upset comprising heating the bonded metal piece between secured locations to a temperature in the range of 0.35-0.95 of the melting temperature of the metal and applying a second axil force to the bonded metal piece to upset the bonded metal piece and form a solid phase bond.

26 Claims, 15 Drawing Sheets

(56) References Cited

OTHER PUBLICATIONS

Fischer et al., "Development of the Thermo-Acoustic Upset-Butt Welding Process," Welding Research Council, Supplement, pp. 38-s to 50-s, Feb. 1977.

Moebus et al., "Welding in Front of the Extruder," Wire and Cable Technology International, Sep./Oct. 2013, 2 pages.

Strecker, "Buttwelding machines with Strecker dual upset method," August Strecker GmbH & Co.KG, Mar. 17, 2014, 2 pages.

Wafios, Strecker Model SS80, WAFIOS Machinery Corp. Branford, CT, Mar. 17, 2014, 1 page.

* cited by examiner

SECTION B-B

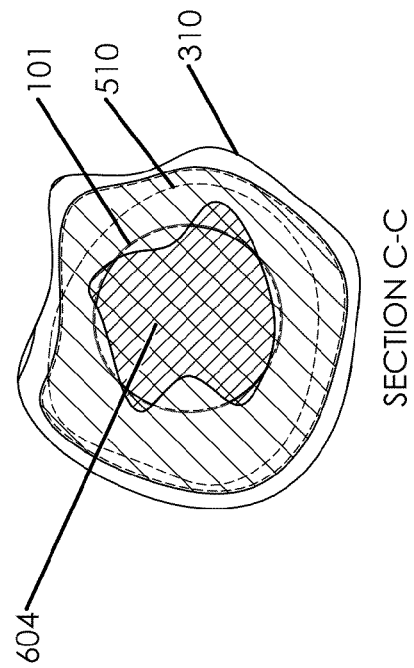
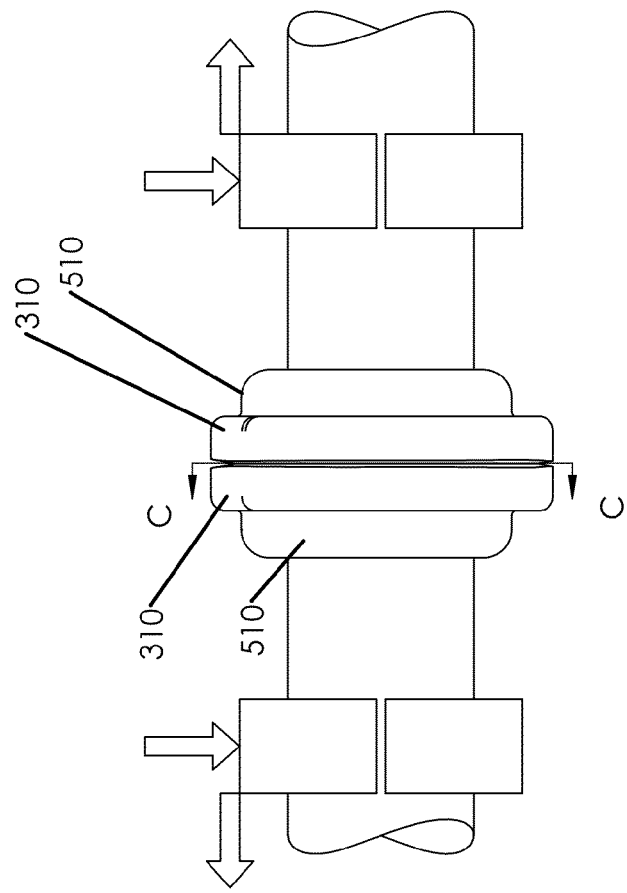

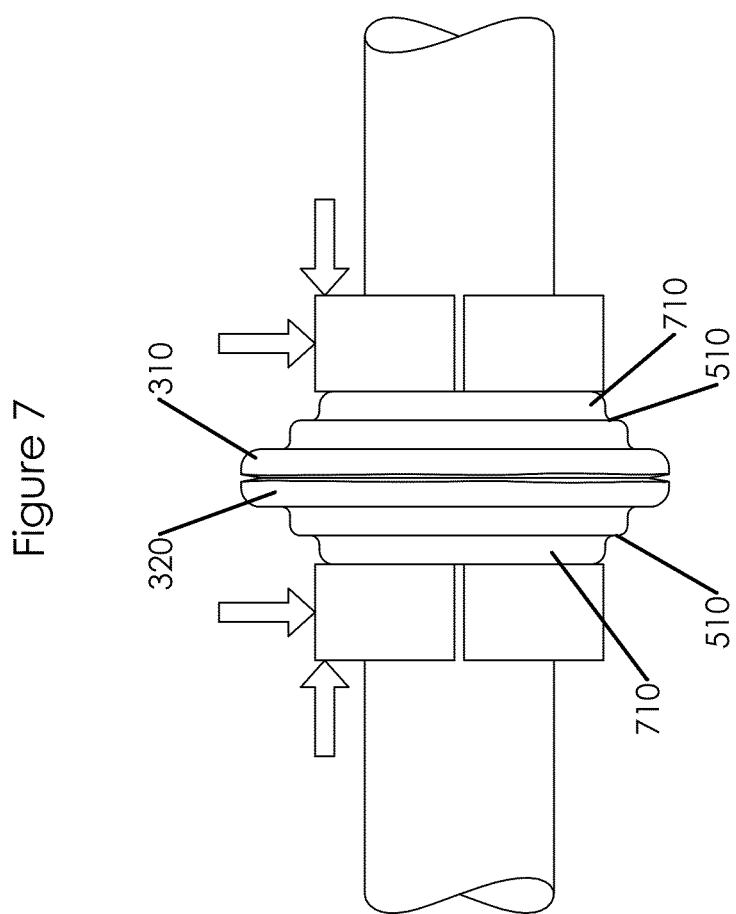

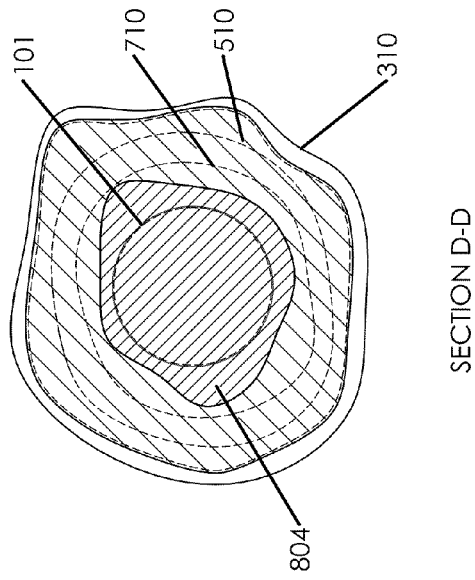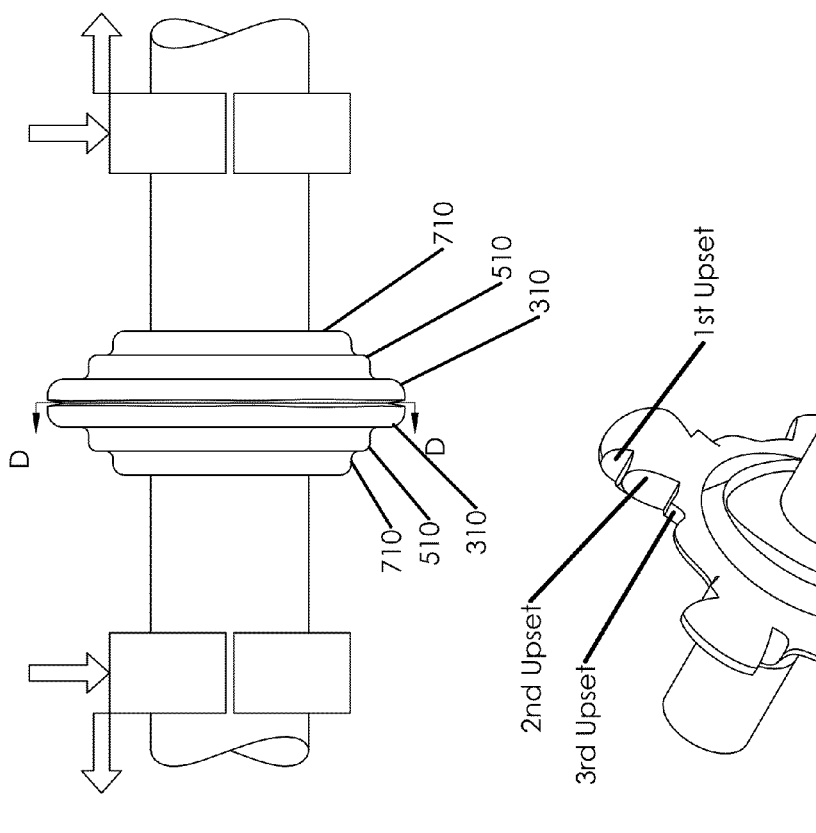

SECTION A-A

WARM BOND METHOD FOR BUTT JOINING METAL PARTS

INCORPORATION BY REFERENCE

All patents, patent applications and publications cited herein are hereby incorporated by reference in their entirety in order to more fully describe the state of the art as known to those skilled therein as of the date of the invention described herein. axial

TECHNICAL FIELD

This technology relates generally to joining metals. In particular, this invention relates to solid phase bonding techniques. The process can be used for butt joining metal lengths end to end. In particular, the process relates to butt bonding high speed steel, metals or metal alloys, whose structure is altered in a flash-butt welding process or other welding process where the material is heated to above melting.

BACKGROUND

Flash butt welding is a technique for joining lengths of metal that are aligned end to end and then are electronically charged, producing an electric arc that melts and welds the ends of the segments, yielding a joined connection. The ends of the material are upset during the melt stage of the process thereby expelling most of the melted material from the interface. This produces a "flash" around an interface of solidified metal.

Heating and melting changes the microstructure and properties of the material at the interface. In addition to the weld area, a heat-affected zone (HAZ) is formed adjacent the weld. The heat-affected zone is the area of base material that is not melted during the welding process, but which has had its microstructure and properties altered by the welding operation. While butt welding typically provides an annealing cycle to soften the HAZ, it cannot restore the material to its original condition. Moreover, the additional steps introduce extra time, cost and complexity to the process. Therefore the HAZ will not perform like the bulk material and therefore typically needs to be tagged and removed to avoid damage to post processing operations.

SUMMARY

A joining process is described that completely avoids the formation of a heat affected area (in those metals where this is an issue), while forming a solid phase bond between metal parts. The method can replace traditional flash butt welds where heat affected zones (HAZ) always exist and are undesirable.

In one aspect, a method of solid phase bonding metal pieces includes securing a first edge of a first metal piece and a second edge of a second metal piece in edge to edge contact, wherein first and second metal pieces are secured at locations spaced a distance from the metal piece edges; subjecting the first and second metal pieces to a first upset comprising heating the first and second edges to a temperature in the range of 0.35-0.95 of the melting temperature of the first and second metal pieces and applying a first axial force to the first and second metal pieces to urge the first and second edges together, to upset the metal at the edge to edge contact and form a bond; resecuring the bonded metal piece at locations spaced a distance on either side of the bond; and subjecting the bonded metal piece to a second upset comprising heating the bonded metal piece between secured locations to a temperature in the range of 0.35-0.95 of the melting temperature of the metal and applying a second axial force to the bonded metal piece to upset the bonded metal piece and form a solid phase bond.

In one or more embodiments, the upset of step (d) is repeated one or more times, or the upset of step (d) is repeated one to six times, or the upset of step (d) is repeated one or two times.

In any preceding embodiment, the metal is a ferrous alloy or a nickel alloy or a titanium alloy.

In any preceding embodiment, the metal is a ferrous alloy and the temperature is less than a transformation temperature on the iron-carbon diagram, and for example, the temperature is less than the temperature for formation of austenite.

In any preceding embodiment, the ferrous alloys are selected from the group of low carbon steel, medium carbon steel, high carbon steel, high alloy steels, stainless steel and tool steel.

In any preceding embodiment, the spaced distance is between 1-3 times, or 1-2 times, or about 1.5 times or 1.5 times the metal piece thickness or diameter.

In any preceding embodiment, the axial forces reduce the spaced distance by a factor of more than 1, or a factor of 2, or a factor of 3, or a factor of 4, or a factor of 5 or a factor of about 1-10.

In any preceding embodiment, the first and second metal pieces are heated by resistance heat, by hot gases, or other means.

In any preceding embodiment, the first and second metal pieces are secured using die pairs.

In any preceding embodiment, applying an axial force involves moving the die pairs from a first position spaced apart position towards each other to a second position.

In any preceding embodiment, the die pairs are made of tungsten carbide or high temperature steel such as H-13.

In any preceding embodiment, the die pairs are heated, and for example, the die pairs include a conductive path for the direct current electrical resistance heating circuit.

In any preceding embodiment, the axial force is applied using hydraulic cylinders operably connected to move the die pairs into and out of engagement.

In any preceding embodiment, the metal edges are coated with an indicator element or protective coating before bonding, and for example, the coating is a liquid or gas flux or solder.

In any preceding embodiment, the metals are the same or different.

In any preceding embodiment, the metals edges are of the same size and/or shape or different size and/or shape.

In any preceding embodiment, the method further includes rolling or die drawing the solid phase bonded metal piece, wherein the metal piece undergoes thickness reduction without cracking or bond failure.

In any preceding embodiment, the method further includes incorporating the solid phase bonded metal piece into a saw blade.

In any preceding embodiment, the method further includes incorporating the solid phase bonded metal piece into a weight bearing cable without failure.

In another aspect, a method of solid phase bonding metal pieces includes securing a bonded metal piece at spaced apart locations spaced a distance on either side of a metal joint; heating the joint between the two spaced apart locations to a temperature in the range of 0.35-0.95 of the melting temperature of the metal piece; and applying an axial force along the axis of the joined metal piece to upset the metal at the joint and forming a solid phase bond.

In one or more embodiment, the temperature is less than the transformation temperature of the metal.

In another aspect, a method of fixing a defect in a metal workpiece includes securing a metal workpiece at locations spaced on both side and a distance from a defect of the metal workpiece; heating the defect area between the secured locations to a temperature in the range of 0.35-0.95 of the melting temperature of the metal; and applying an axial force along the axes of the metal work piece to upset the metal in the defect area and displace the defect therefrom.

In one or more embodiments, the temperature is less than the transformation temperature of the metal.

In another aspect, a solid phase bonded workpiece includes a ferrous alloy workpiece having a first microstructure and comprising a solid phase bond, the solid phase bond characterized by the absence of a crystallographic phase different from the first microstructure and a hardness in the range of 0.75-1.25 of the hardness of the first crystallographic phase structure.

In one or more embodiments, the ferrous alloys is selected from the group of low carbon steel, medium carbon steel, high carbon steel, high alloy steels, stainless steel and tool steel.

In yet another aspect, an apparatus for formation of a solid phase bond includes first and second die pairs, each die pair having facing surfaces adapted to grippingly engage a workpiece, a support for supporting each die pair and providing relative movement toward and away from each other between an opened position and a contacting position; a hydraulic cylinder operably connected to the support for moving the first and second die pairs into and out of engagement and capable of applying a force sufficient to plastically deform the metal to accomplish the upset deformation desired. a resistance heater operatively connected to the die pair for heating a workpiece; and a control system with instructions to execute a bonding operation having at least two steps of heating and upset.

In one or more embodiments, the apparatus further includes a constraining device at the workpiece engagement site adapted to prevent buckling of the material during heating and upset.

In one or more embodiments, the apparatus further includes servo motors for positioning of the first and second die pairs.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

In the Drawings:

FIG. 6A is a front view illustration of a subsequent resetting of the dies and heating step after a second upset according to one or more embodiments of the invention.

FIG. 6B is a schematic illustration of the cross-section of the bonded interface along line C-C after two upsets.

FIG. 7 is a front view illustration of a third upset process of the solid bonding according to one or more embodiments of the invention.

FIG. 8A is a front view illustration of a subsequent resetting of the dies and heating step according to one or more embodiments of the invention.

FIG. 8B is a schematic illustration of the cross-section of the bonded interface along line D-D after three upsets.

FIG. 8C is an illustration in perspective view of the progression of incisions after subsequent upsets according to one or more embodiments of the invention.

DETAILED DESCRIPTION

A joining process is described that forms a solid phase bond between metals. The bond provides a clean boundary free of foreign contaminants and having a uniform microstructure throughout the bond. The method is well-suited for joining long lengths of metal, e.g., rods and wires, across the cross-sectional area. The bonding process can be used to create continuous lengths of metal.

In one embodiment, the metal segment ends of the two metal pieces are abutted and heated below the melting point of the material. In particular, the temperature is kept below the metal's transformation temperature. Staying below the transformation temperature preserves the original microstructure of the metal during the joining phase. Axial forces are applied to the heated segments that are large enough to cause an upset, e.g., a decrease in length and increase in width, at the interface of the two metal pieces. The axial forces can be applied before during or after heating the metal segment ends. The heated metal softens and, under pressure of the applied axial force, material from the original interface of the two abutting metal end segments is forced out in a radial direction until all original surface material is expelled. The result is a solid phase bond at the atomic level between the segments that is free of any foreign contaminants. As the metal does not reach transition temperatures, the bond and surrounding regions retain their original microstructure. Each heating and axial force compressing is collectively referred to an 'upset' or 'upset stage'.

Figure 1:
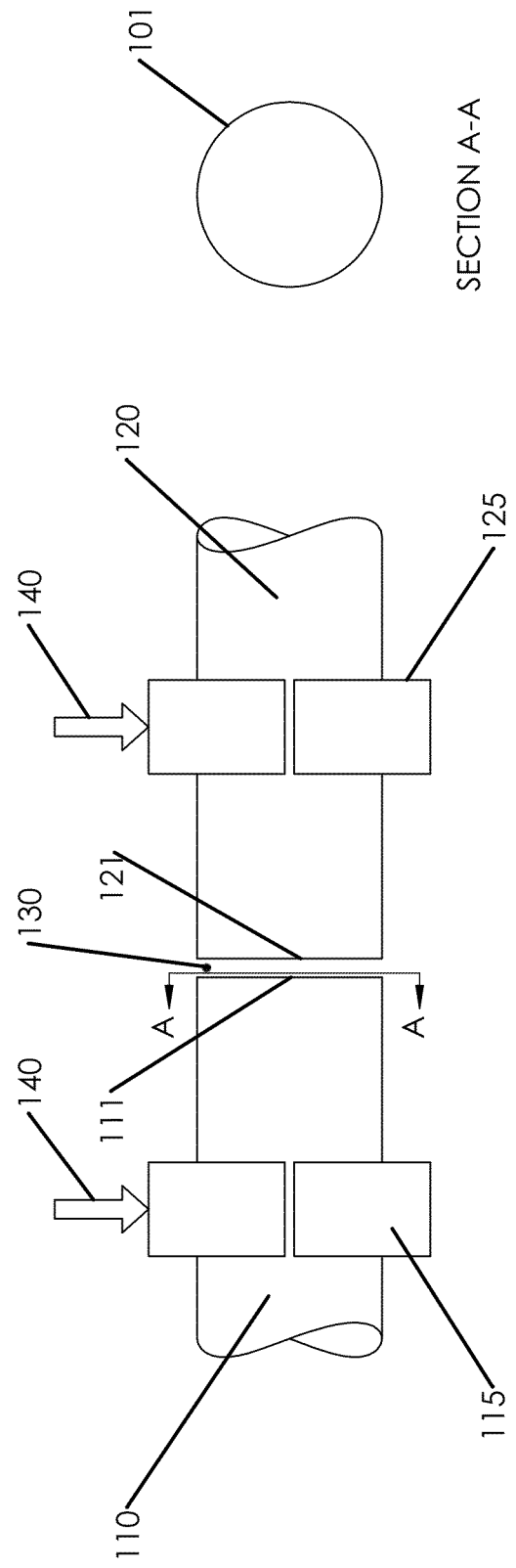
FIG. 1A is a side view illustration of two metal work pieces secured in abutting, no-slip clamping and in electrical contact according to one or more embodiments of the invention.
FIG. 1B is a schematic illustration of the cross-section of the bonded interface along line A-A before upset.

Aspects of the process are described with reference to FIGS. 1-8. FIG. 1B is a side view of two metal pieces 110, 120 prior to bonding. The clean unhatched surface indicates that there is no bonding between the two metal pieces at the bondline position. Metal pieces are positioned in edge-to-edge abutting relationship so that terminal end 111 of metal piece 110 is adjacent to terminal end 121 of metal piece 120, meeting at interface 130. The solid phase bond is formed between the two contacting edges of the metal pieces. The process can be used to join a variety of metals, including ferrous metals such as low carbon steel, medium carbon steel, high carbon steel, high alloy steels, stainless steel and tool steel, as well as titanium and nickel alloys. The process finds particular application in joining hard metals, such as tool steel. Tool steels include carbon and alloy steels that are well-suited for incorporation into tools due to their hardness, ability to hold and edge and/or their resistance to deformation at high temperatures. In one or more embodiments, the metals include high carbon steel or high speed steel. The metals can be the same or different, but typically the metals are the same.

The metal can be any form or shape that has a presenting surface that can be bonded to a second surface. The metal pieces are typically elongated such as wires, rods and flats. The cross-sectional areas of the abutting terminal ends are not required to be identical. However, metal pieces that differ significantly in size will exhibit differences in heating, cooling and solidification, which will affect the bonding process. In one or more embodiments, the cross-sectional areas of the abutting terminal ends are substantially the same. For example, the two areas differ by no more than 25% or 20% or 15% or 10% or 5% or 1%.

The metal work piece is not limited to any particular size or diameter. However, the metal work piece is desirably heated throughout its thickness (or diameter) which can place a practical upper limitation on the work piece size or thickness depending on the particular metals and temperatures that are employed. The size of the workpiece may also be constrained by the practical limits of available hydraulic pressure for compressing the heated metal parts.

In certain embodiments, the metals can be used without special treatment, since the edge metal is displaced from the interface and a clean metal surface is presented at the bond site. See, e.g., Example 2-4. In other embodiments, the metal edge can be cleaned prior to joining. For example, the metal end can be coated with a liquid or gas flux. In still other embodiments, the metal edges (treated or untreated as described herein above) can be brazed with an oxide barrier, such as silver solder, to avoid oxidation of the metal during heating. See, e.g., Example 1.

The ends of each metal piece, e.g., a wire, are secured in the dies and extend a short distance beyond the end of the dies. The metal pieces 110, 120 are secured in dies 115, 125, respectively. Dies 115, 125 hold the metal pieces in place with sufficient grip that they do not slip during operation and can include surfaces that are capable of grippingly engaging the workpiece. FIG. 1A shows the dies secured around the wire ends using a clamping pressure 140. The dies are secured, for example by clamping, so that the metal pieces do not slip when axial force is applied. In addition, the dies can serve as heaters to help regulate the heating process during operation. The clamping dies can be made of tungsten carbide or high temperature steel such as H-13. A pre-upsetting axially applied force can be applied to the clamping apparatus, thereby bringing the metal piece ends tightly together.

In the next step, the abutting ends of the metal workpieces are heated to a temperature below their melting temperature ($T_m$). The temperature is selected to bring the metal to a point where it softens and is capable of plastic flow. In one or more embodiments, the metal workpieces are heated to 0.35-0.95 $T_m$. In one or more embodiments, the metal workpieces are heated to greater than 0.35 $T_m$, or greater than 0.4 $T_m$ or greater than 0.45 $T_m$ or greater than 0.5 $T_m$ or greater than 0.55 $T_m$ or greater than 0.6 $T_m$ or greater than 0.65 $T_m$ or greater than 0.7 $T_m$ or greater than 0.75 or greater than 0.8 $T_m$ or greater than 0.85 $T_m$ or greater than 0.9 $T_m$ or up to 0.95 $T_m$ or in a temperature range bounded by any of the ranges disclosed herein. In one or more embodiments, the metal is a ferrous material, and for example, is a ferrous alloy. Iron metal and ferrous alloys are characterized by a transformation temperature in which the metal undergoes a phase change. For steels, the transformation temperature is that temperature on the iron-carbon diagram where austenite begins forming on a temperature rise. If a steel workpiece is maintained below the transformation temperature, the iron-carbon microstructure of the steel alloy does not change. In one or more embodiments, the ferrous metal workpiece is heated to a temperature that is less than the transformation temperature, and for example, is heated to a temperature that is less than the transformation temperature for the formation of austenite. By keeping the temperature below the transformation temperature of the constituent metal of the metal workpiece, the bond area does not have a heat affected zone. A heat-affected zone (HAZ) is the portion of the base metal outside the bond area whose microstructure and mechanical properties are altered by the heat. This alteration can be detrimental, causing stresses that reduce the strength of the base material, leading to catastrophic failures. Because the bond area is heated below the transformation temperature, no heat affected zone is observed.

Figure 2:
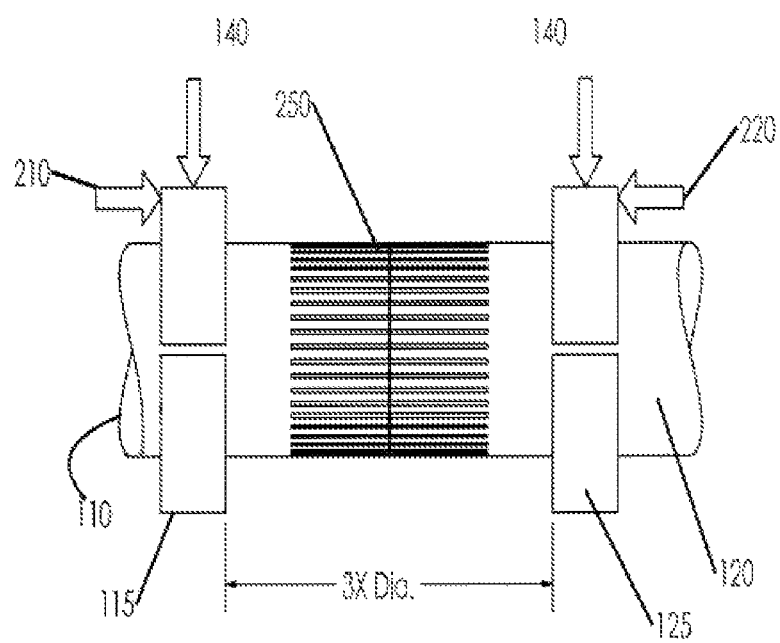
FIG. 2 is a front view illustration of a heating step according to one or more embodiments of the invention.

FIG. 2 is a cross-sectional view of the end segments of metal work pieces 110, 120 under heating in region 250. The metal end segments are desirably heated to a temperature that softens the metal. In the case of ferrous materials, the metal end segments can be heated to a temperature that softens the metal but remains below the materials transformation temperature of the metal. For example, high speed steel undergoes phase transition at temperatures of greater than 1300° F. Heating temperatures of about 1100-1300° F. can be used for the processing of high speed steel according to one or more embodiment. Transformation temperatures for other ferrous metals vary, depending at least in part on the carbon level and presence of other alloying elements. Selection of suitable temperatures based on transformation temperatures can be made based on available information regarding transformation temperature of the materials of interest. Heating can be accomplished by directly heating the abutting segments of the metal workpieces or by heating the dies that secure the work piece ends. The wire can be heated by resistance heat or other means e.g., gas torch, and the like. Other conventional methods for metal heating, e.g., laser heating, are contemplated. In one or more embodiments, the dies are heated and the heat is transferred to the clamped wires. The dies can be heated using any conventional means, such as electrical resistance heating. In one particular embodiment, the dies are heated by electrical cartridge heaters that are inserted into the die body.

In one or more embodiments, the dies are preheated. For small diameter wires, the heatsink capacity of the dies may result in steep temperature gradient that can be reduced by die heating. By preheating the dies, the heatsink effect is reduced. In other embodiments, the dies can be preheated to reduce flash thickness. The final flash thickness is function, at least in part, of die temperature. Heating the dies reduces flash thickness. For example, for a 0.200" diameter high speed steel rod clamped in unheated dies and heated to about 1000° F., the flash thickness is about 0.8 rod diameter. The same rod in a heated die, e.g., a tungsten carbide die heated to about 1200° F. (ca. 650° C.), may produce a flash thickness of about 0.2 rod diameter.

The wire end segment to be heated is not required to be of any particular length; however, the wires extension length should not be so great that the wires buckle or bend under pressure when heated. Similarly, the wire extension length should be sufficient to provide for enough volume of material such that when it is upset a sufficient amount of contaminated material at the interface is radially forced out. Allowing for an insufficient volume of material will result in entrapped contaminants thereby inhibiting a bond. In certain embodiments, each wire extends a distance of about 1-3 times, or 1-2 times, or about 1.5 times or 1.0 times its diameter from the die, so that the dies are spaced apart about 2 to 6 times the wire diameter, or to any range that is bounded by any of the values noted above. In one or more embodiments, the dies can be positioned at even greater distances by positioning a restraining clamp or ring around the joint region. The restraining ring helps prevent buckling of the metal wire segments during application of axial pressure. This device provides for the dies to be spaced further apart thereby allowing a larger volume of metal to flow radially away from the interface. The result is more contaminants are removed from the interface in one upset reducing the overall number of upsets needed to provide an acceptable bond.

FIG. 2 shows an exemplary distance of 3 times the wire diameter, e.g., each wire extends about 1.5 times its diameter beyond the die. The heating zone 250 is depicted as spaced apart from the edges of the dies, which reflects possible heat gradient near the dies due to the heat sink properties of the dies and which is not intended to suggest that the heating zone is spaced apart from the dies.

In the case where the metal workpieces are not the same shape or diameter, the distances can be adjusted to take into account these differences, so that the spacing of each end segment to the die support is suitable for the specific workpiece is it securing.

Figure 3:
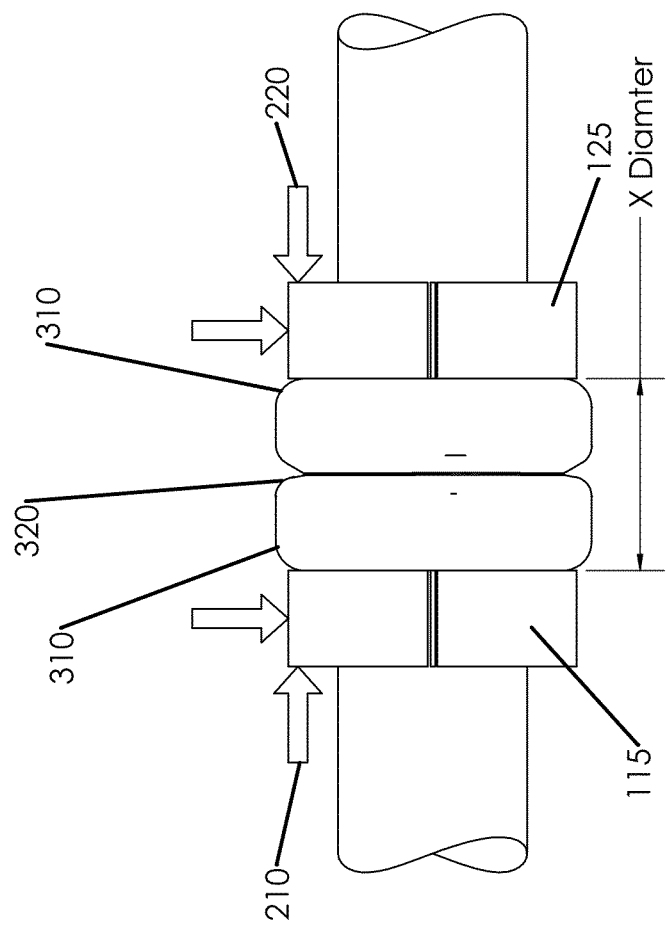
FIG. 3 is a front view illustration of a first upset process of the solid phase bonding according to one or more embodiments of the invention.

In one or more embodiments, when the appropriate temperature is attained, an axial upset force is applied to the die in the direction of arrows 210, 220 in FIGS. 2 and 3. In other embodiments, an axial force can be applied before and/or during the heating process. The axial force presses the heated metal zone towards one another, causing the softened metal to be displaced radially and to form a metal bulb or "flashing" 310 incorporating the interface between the two metal pieces, as is illustrated in FIG. 3. In addition, the increased diameter of the metal piece as it bulges outward during upset, helps prevent slippage of the metal work piece in the dies and helps maintain the axial pressure on the bond site. In its softened state, metal at the interface is forced away from the interface center, exposing clean metal that creates a new interface. The resultant joined metal piece 320 contains a solid phase bond between the individual metal pieces. The bond provides a clean boundary free of foreign contaminants and having a uniform microstructure throughout the bond which is identical to the bulk material. In one or more embodiments, the bond microstructure is identical to that material within the hourglass shape and identical to the bulk wire, the only exception is hardness, where the hardness is slightly increased. See, Example 2, below.

In one or more embodiments, the axial force is applied uniformly. In other embodiments, the force can ramped up or down during the upset stage. In embodiments in which multiple upset stages are used, the axial forces can be the same or different for each stage.

The greater the volume of displaced material at the interface, the greater the compression factor. The compression factor is the ratio of the starting distance between the dies and the finishing distance after the upset. In one or more embodiments, the axial forces reduce the spacing between the dies by a compression factor of more than 1, or a factor of 2, or a factor of 3, or a factor of 4, or a factor of 5 or a factor of about 1-10 during upset, or to any range that is bounded by any of the values noted above. The extent of compression can be a function of heat loss as the metal is compressed. For example, if a heat sink is provided that increases the heat loss to the metal pieces during compression, the heated sections will cool and 'freeze' more rapidly, resulting in bond formation with a smaller compression factor. In one or more embodiments, the dies can be heated or cooled to control the heat loss of the metal work piece through the dies.

In the embodiment illustrated by FIGS. 1-3, the spacing is reduced by a factor of 3—from 3× to 1× the wire diameter. The applied force can vary depending on the nature of the metal; softer metals requiring less compression force than harder metals in order to displace the heated core. Similarly, for the same metal greater compression forces may be required at lower heating temperatures. The size of the metal work piece will also influence the force selected for this step, with larger diameters requiring greater compressive forces. In one particular embodiment, the force is about 4000 lbs. In another embodiment, 2 cylinders each capable of applying 8800 lbs. produce a combined total of 17,600 lbs. On a 0.370" diameter wire, a specific pressure can be as high as 165,000 psi.

In general, an axial force is applied until the heated metal segment cools and solidifies, although it is contemplated that the axial force is applied until a desired axial displacement is achieved. In one or more embodiments, a stop can be used to limit axial displacement beyond a desired end point, e.g., 1 diameter.

In one or more embodiments, the axial force is applied as hydraulic pressure, for example using hydraulic cylinders. In one or more embodiments, one die is stationary and the other die is moved towards the stationary die. In other embodiments, both dies are movable. The hydraulic cylinders can be operably linked to the die pair holding the metal workpieces. Other methods for applying axial force are contemplated, for example, by knuckle press or mechanical screw. A single upset metal solid phase bonding is described in FIGS. 1-3; however, the metal work piece can be subjected to multiple upset stages to further consolidate the metal at the bond site. FIG. 4B is a schematic illustration of the cross-section of the bonded interface along line B-B after one upset. The cross-section shows the original wire diameter 101 as well as the flash diameter 320. The contacting surface between the former two metal pieces is shown as large hatched area 330; however, the contact area may not have formed a solid phase bond over the entire surface. Shown here in FIG. 4B, the smaller area 404 indicates the region of solid phase bond.

More typically, more than one upset step is used in order to obtain a uniform solid phase bond across the entire workpiece interface. The number of upset stages can range from one to 2 or more. Additional upsets can be used to strengthen the bond and reduce discontinuity or defects at the interface. There is no theoretical upper limit, but there may be a practical limit in which additional upsets do not further improve the quality of the solid phase bond. Exemplary bonding processes can employ 1 or 2, or 3, or 4, or 5, or 6, or 7, or 8, or 9, or 10 or up to 20 upsets. In one or more embodiments, 2-10 upset stages can be employed. In particular, 2-5 upset stages, or 2-4 upset stages or 3 upset stages can be used. In particular embodiments, high speed steel wires subjected to 3 upset stages were shown to form a solid phase bond having a uniform microstructure throughout the bond which is identical to the bulk material.

Figure 4:
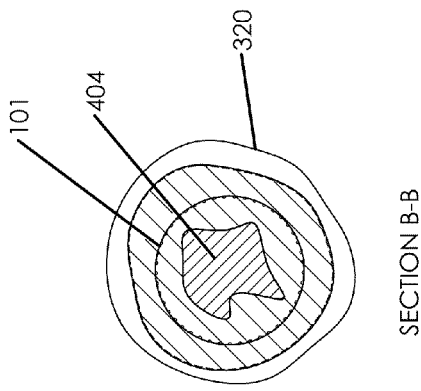
FIG. 4A is a front view illustration of a subsequent resetting of the dies and heating step after the first upset according to one or more embodiments of the invention.
FIG. 4B is a schematic illustration of the cross-section of the bonded interface along line B-B after one upset.
FIG. 4C is a schematic illustration of incisions made in the flash of the upset material according to one or more embodiments of the invention.
Figure 4A:
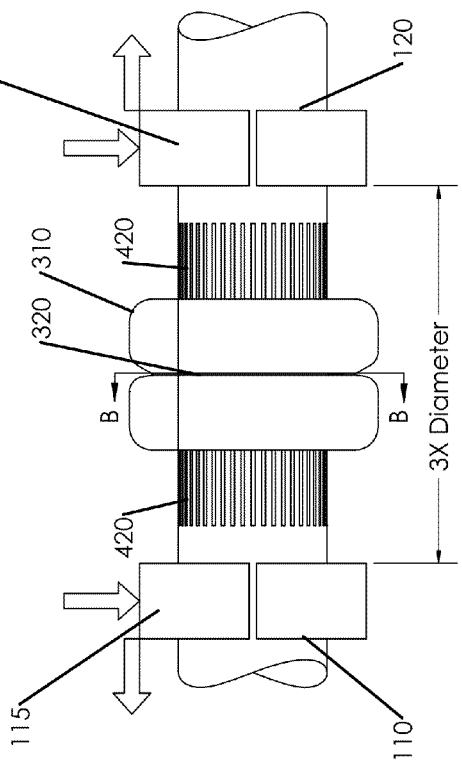
Figure 5:
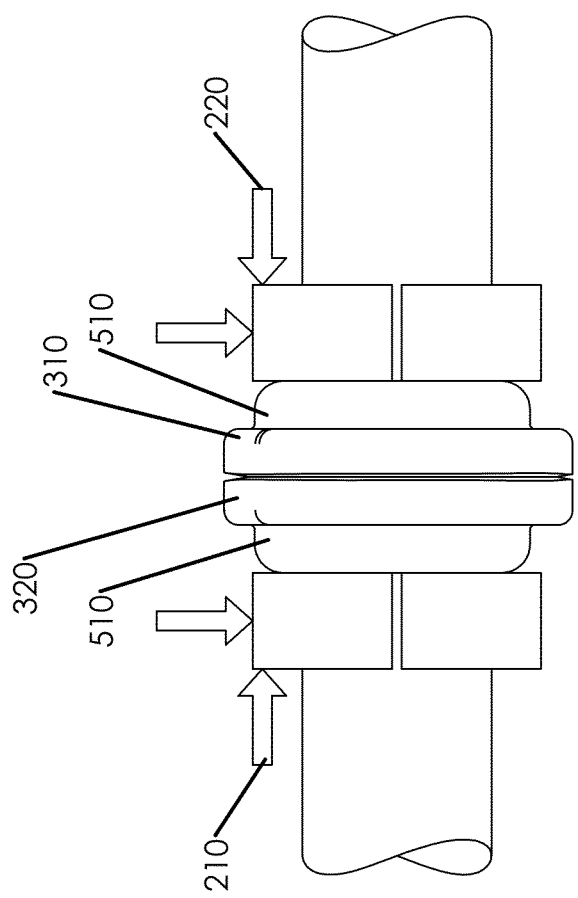
FIG. 5 is a front view illustration of a second upset process of the solid bonding according to one or more embodiment of the invention.

A multiple upset method according to one or more embodiments is illustrated in FIGS. 1-8. The bonded work piece 110 and 120 prepared according to FIGS. 1-2 as described herein above is removed from the dies and the dies are repositioned and spaced apart from bond FIG. 4A. The die spacing can be the same or different as that used in the initial upset step. As shown in this exemplary embodiment, the dies are set at 3 times the wire diameter as was used in the first upset step. Heat is applied to the region 420 located between the dies, as shown in FIG. 4A, and an axial upset force 210, 220 shown in FIG. 5, is used to further compress the bond region, radially displacing additional metal 510 from the bond site and further distributing new metal at the bond interface 604. FIG. 6B provides an illustration across the bond line after the second upset. The original location of the metal edge 101 is shown, as well as the location of the previous metal flash 310 and the new flash 510. Metal bonding attachment across the surface can increase significantly. In some instances, the bonding across an area of the original metal piece can be complete. In other cases, as is illustrated here, the solid phase bonded area 604 substantially, but not completely, covers the original metal interface area.

The dies are then repositioned as shown in FIG. 6A by moving the clamps along direction shown by arrows 660 and the metal edges are again pressed together by applying an upset pressure along the direction indicated by arrows 720 in a third upset stage FIG. 7 and material from the upset interface is further forced outward to provide flashing 710. FIG. 8A provides an illustration across the bond line after the third upset. The location of the previous metal flashes 310 and 510 are shown, as well as metal flash 710. FIG. 8B shows that the bonding area 804 across an area of the original metal piece is now complete. The original location of the metal edge 101 is shown. The metal flash is removed and a solid state bond remains across the full metal interface. According to one or more embodiments, the bond grows or increases with each upset until it fills the entire cross section.

Figure 9:
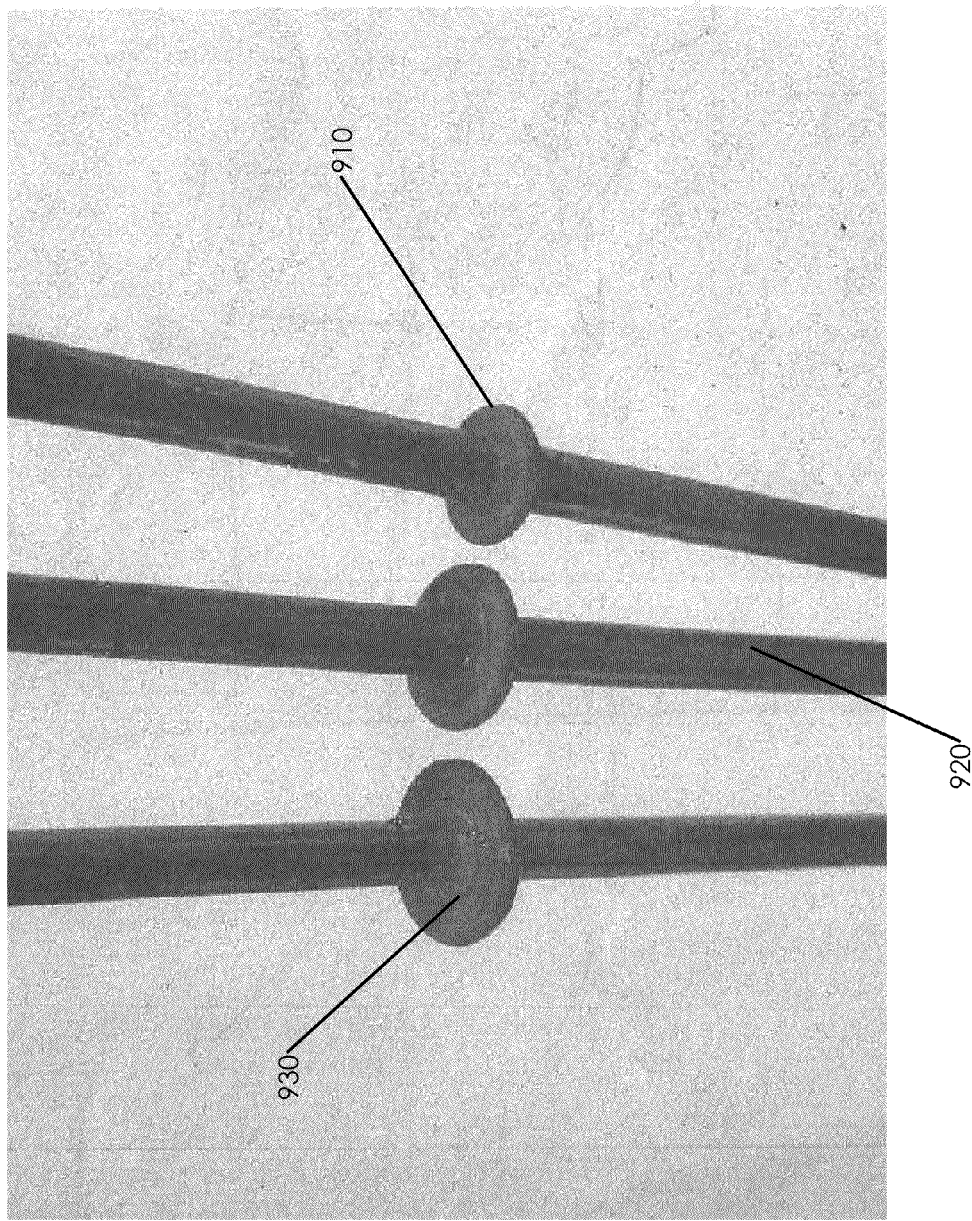
FIG. 9 is a series of photographs of ABC III wire lengths that have been bonded using one, two and three upset steps, without incisions according to one or more embodiments.

FIG. 9 is a photograph of three bonded work pieces. The metal wires are ABC III metal and the edges were belt sanded before bonding, but otherwise no additional pretreatment was used. Work piece 910 was subjected to a single upset step. A single metal flashing was formed symmetrically around the bond site. Work pieces 920 and 930 were subjected to two and three upset steps, respectfully. These bond sites show two and three concentric metal bands about the metal bond site corresponding to each upset stage (the ring furthest from the wire being formed in the first upset step).

Figure 4C:
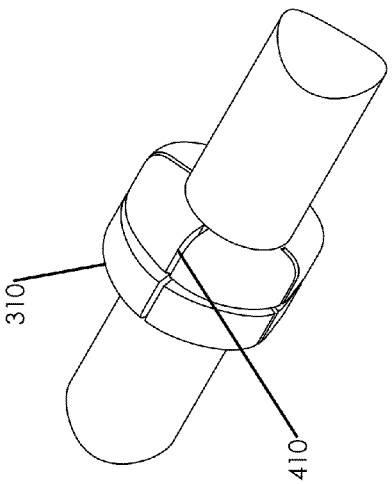

As the bonded metal piece is subjected to additional upsets, the metal flashing may experience hoop resistance that can hinder subsequent uniform expansion. In order to facilitate additional upset steps, the metal bulb or flashing 310 optionally can be slit radially, for example, along line 410 as shown in FIG. 4C. The slits relieve the constraint to circumferential expansion. One or more slits can be used. For example, slits can be introduced along the circumference of the metal flash circumference as regular or irregular intervals. One, or two or more slits, such as 2, 3, 4, 5, 6, up to 10 or more slits can be used. In one embodiment the flash is completely removed. The radial slit reduces hoop resistance to expansion in subsequent heating/upset processes. Radial slits can be introduced after each update stage, if desired. Alternatively, radial slits can be used in some, but not all, upset stages. For example, it may be desirable to radially incise the metal flash after the first few, e.g., 1-4, upsets; additional upset stages may not need to be cut. Alternatively, the flashing can be removed by sanding or other method between upset steps.

FIG. 8C is a perspective drawing of a bonded work piece illustrating the expansion of the expelled metal after multiple upsets (here 3 upsets are shown). The flashing from the first, second and third upsets are indicated in the figure. In this illustration, radial slits were introduced after the first and second heating and axial force compressing step, as is indicated by the step along the sides of the expanded metal flash. The final upset step formed a symmetric metal band around the bond site 810. Once a suitable bond is obtained, the excess material can be removed, for example by grinding or shearing to achieve the desired final bulk dimension. Alternatively, the excess material can be removed after each upset stage.

In one or more embodiments, a non-destructive method of determining the reliability of a bond is provided. A marker element can be inserted at the interface at the first upset. For example, the marker can be a soft metal such as aluminum or silver. After a specified number of upsets are conducted as described herein, the flash area from the final upset is examined. If no traces of the marker element are present in the last upset, it is an indication that all material originally present at the interface has been displaced. The bond is certified as successful.

In one or more embodiments, a non-destructive method of determining the reliability of a bond is provided. After a specified number of upsets are conducted as described herein, the flash around the bond area is removed. A subsequent upset according to the methods described herein is conducted. The flash can then be inspected under low magnification. If the flash forms a clean ring without visible defects such as cracks or splitting, it is an indication that all material originally present at the interface has been displaced. The bond is certified as successful.

In another aspect, the steps of heating and compression can be used to improve an existing joint. In other embodiments, the method can be used to remove a defect on the surface of a wire. For example, in a joint that has entrained microstructural defects or material impurities, the area surrounding the joint can be heated and subject to axial force, displacing the defective material or regions. The defect could be positioned between the dies with its respective spacing, e.g., 3× spacing. This may require only one upset to move the defect beyond the diameter of the bulk material.

In other embodiments, defect may be cut out and the ends re-attached using the bonding methods set out herein.

Figure 10B:
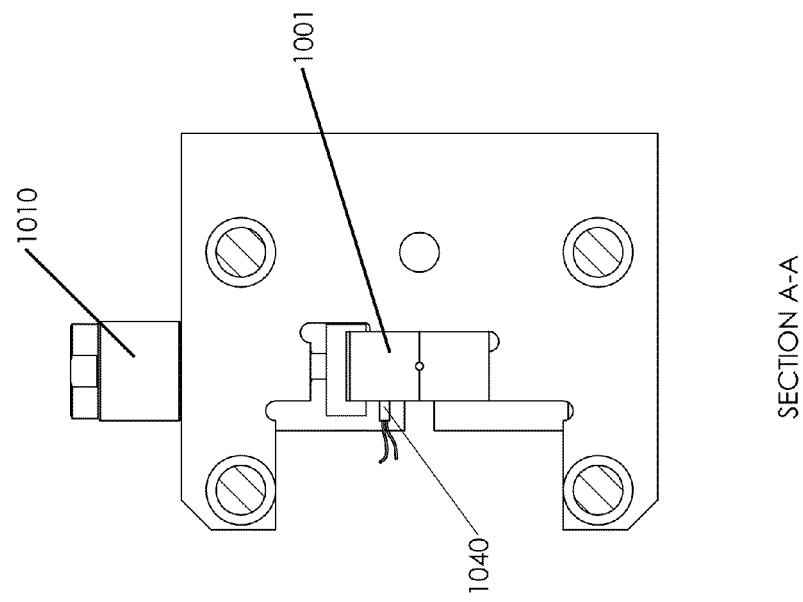
FIG. 10A is a front view on a bonding apparatus for performing the warm bonding and FIG. 10B is an end view along line A-A of the apparatus, according to one or more embodiments.
Figure 10A:
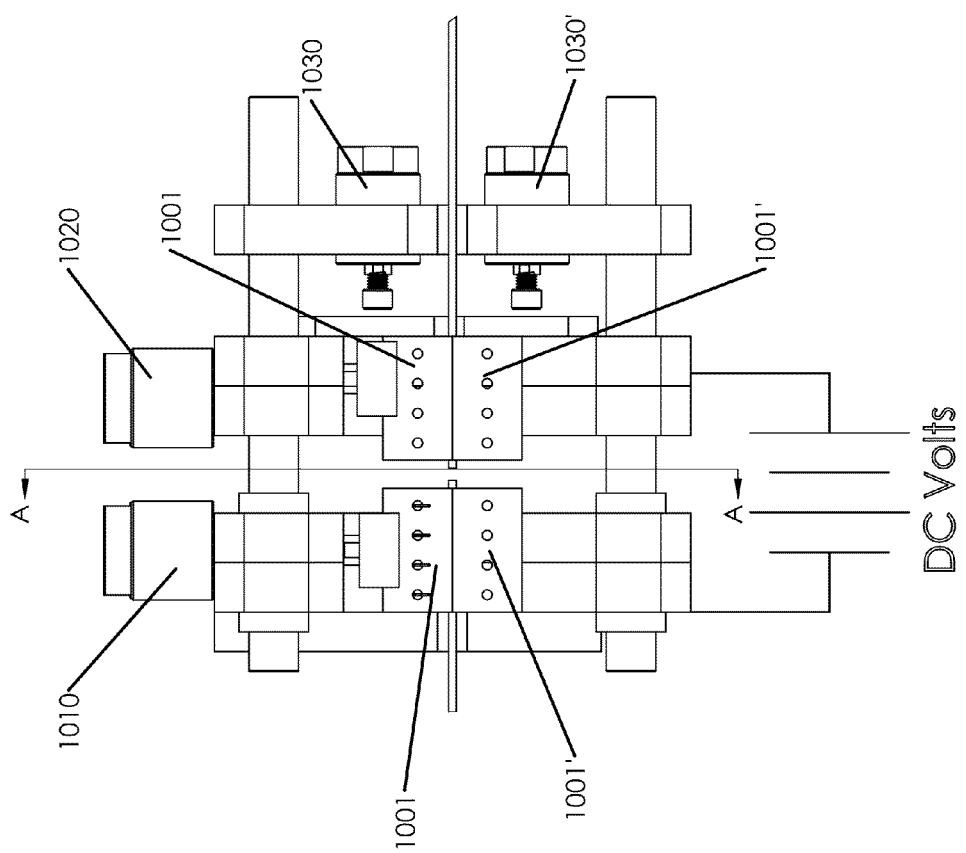

An apparatus suitable for use in preparation of the bonded work piece is shown in FIG. 10 in front view (FIG. 10A) and side view along line A-A (FIG. 10B), in which like elements are similarly numbered. In general the apparatus for formation of a solid phase bond includes a die set of four 1001, 1001', each die having facing surfaces adapted to grippingly engage a workpiece, a support for supporting each die of the die set and providing relative movement toward and away from each other between an opened position and a contacting position; hydraulic cylinders 1030,1030' operably connected to the support for moving the die pair into and out of engagement and capable of applying a total force, e.g., of at most 17,600 lbs.; a resistance heater operatively connected to the die pair for heating a workpiece; and a control system with instructions to execute a bonding operation having at least two steps of heating and upset. The apparatus is adaptable to include fully automated programmable controls. Automation would involve servo motors for repeat positioning of dies as well as automated heating and hydraulic actuation. The operation of the apparatus is also achievable by manual means.

The device uses clamping dies 1001, 1001' to secure and optionally heat the wires. These dies may also be used as the conductive component for the direct current electrical resistance heating circuit. FIG. 10B shows dies 1001 heated using four electrical cartridges heaters 1040. External heating of the dies is optional. The dies are secured around the metal wire workpieces by hydraulic clamps 1010 and 1020. In other embodiments, the four clamping dies are backed up by a second set of dies for a total of eight clamping dies. The additional dies can be used to hold the wire in place while the four dies at the joint do the metal upsetting. In FIG. 10B, 1010 is the hydraulic cylinder that applies the claiming force to the dies, indicated as 1001.

The invention is described in the following examples, which are presented for the purpose of illustration only and are not intended to be limiting of the invention.

Example 1

A bond between two 0.205" ABC III high speed steel wires is described. The wires were coated with silver brazing before bonding.

Heated dies are clamped onto the components being joined with clamping forces sufficient to prevent axial slipping inside the dies. In this embodiment the components are 0.205" diameter high speed steel wire, the ends of which were coated with Ag solder. The wire protruded from each die by about one and one half times the diameter. The wire was heated to a temperature below the materials transformation temperature 1300° F. (ca. 705° C.). While at temperature the dies were forced together until the dies are approximately one diameter length apart. Exemplary axial forces are about 7000 lbs. This caused the ends to form a donut shaped bulge. The two wires were subjected to a total of 6 upset stages, in which the first three upsets were slit in four places after upset; the remaining 3 upsets were not slit between stages. The two wires are joined at the center plane where the interface of two wires previously existed.

Figure 11A:
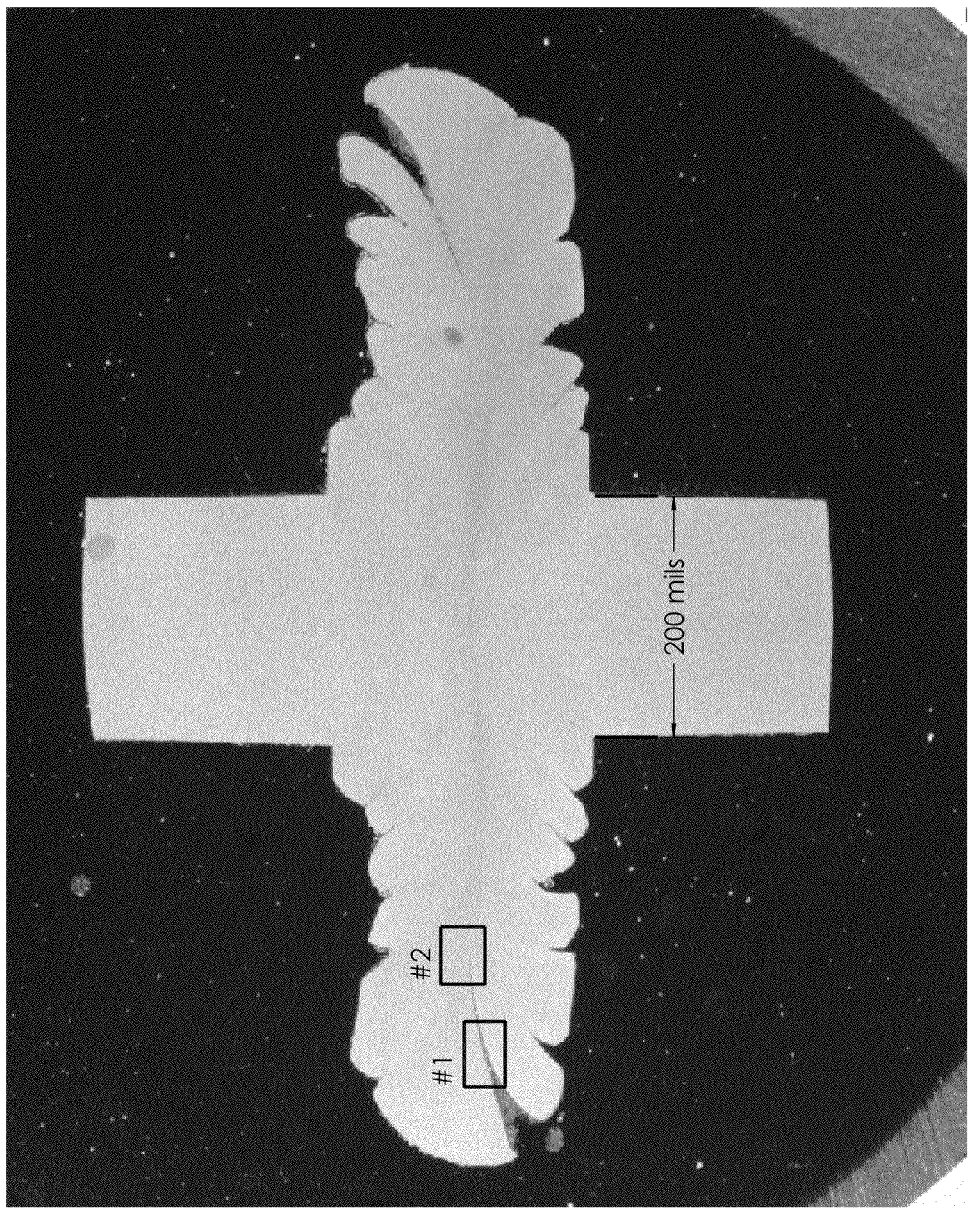
FIG. 11A is a photograph (3.5×) of a longitudinally cut wire subjected to warm bonding using 6 upset stages, according to one or more embodiments.
Figure 11B:
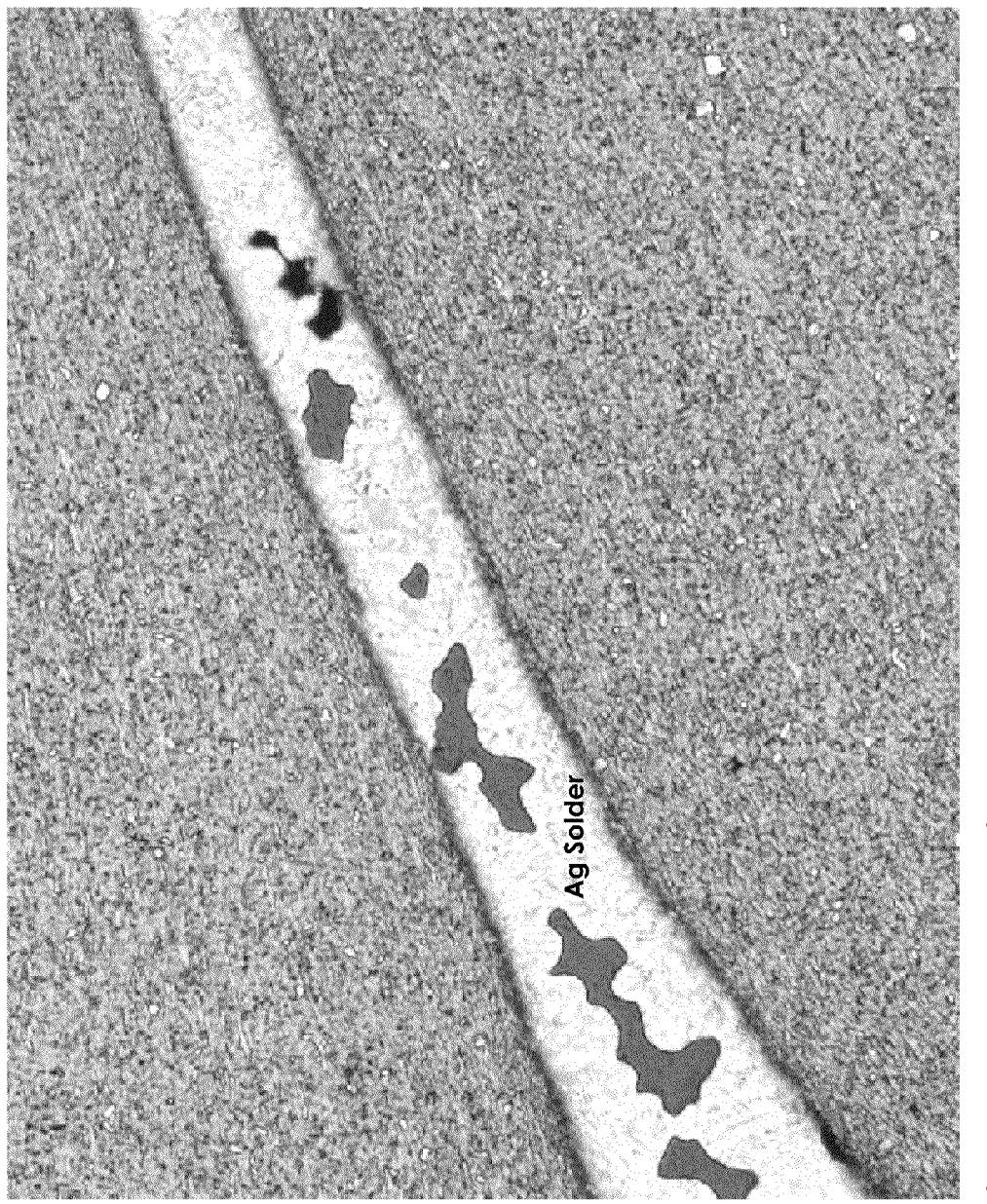
FIGS. 11B and 11C are magnified views of sections #2 (1290×) and #1 (100×), respectively, from the bond area of FIG. 11A.
Figure 11C:
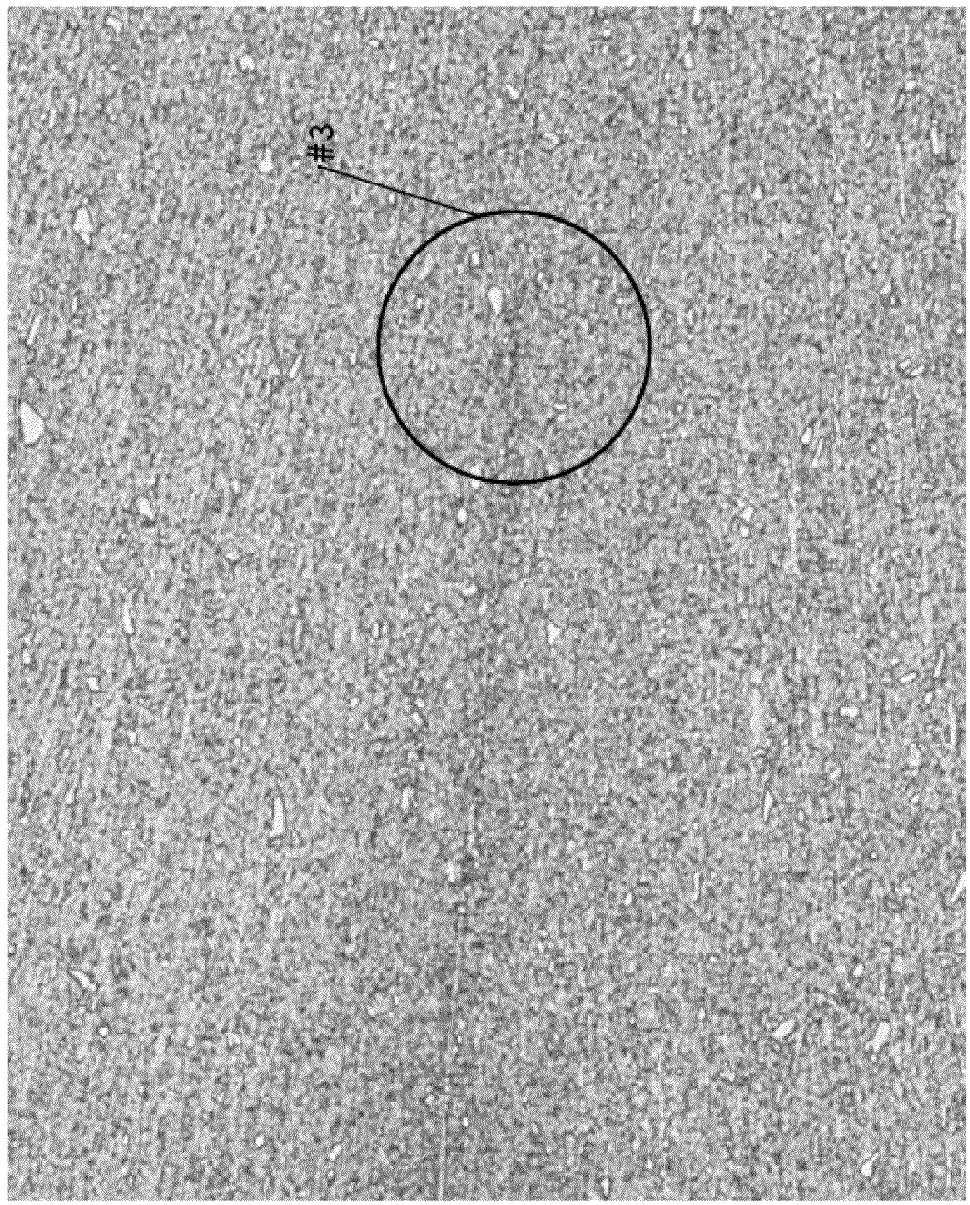

A longitudinal section through the irregularly shaped bond area was prepared to the centerline in order to examine microstructure and determine hardness. FIG. 11A is a photograph (5.4×) of a transverse view across the bond area, showing the bond and metal flash expelled from between the two wires during bonding. FIGS. 11B and 11C are higher magnification images of the bond taken at locations #1 and #2 indicated on the photograph of FIG. 11A, respectively. There is no visible bond line to the right side of FIG. 11C. Silver brazing used to seal ends before welding is observed in the expelled material. FIG. 11B (10×) shows the silver solder that had been expelled from between the two metal wires. FIG. 11C (1250×) shows the metal microstructure along the location where the two metal pieces had been joined. Location #3 shows the point which the bond line changes from poor and visible to becoming indistinguishable from the bulk material. There is no visible indication of where the bond line is between the two pieces and the metal product contains a continuous solid phase metal at the bond that is free of defects, cracks and microstructure phase transformation. The uniformity of the material made it impossible to even identify the bond location.

Figure 12:
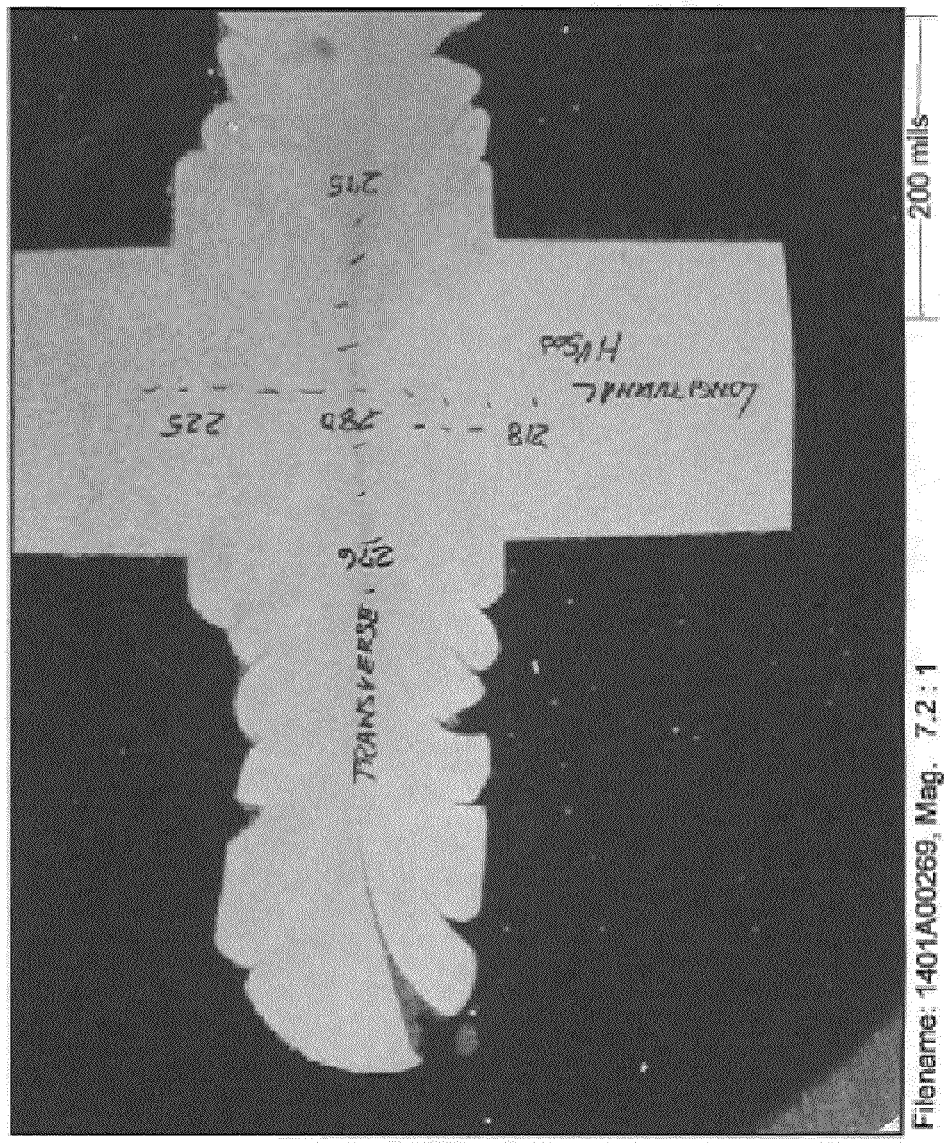
FIG. 12 is a photograph of the longitudinally cut wire of FIG. 11A, with locations of hardness measures indicated.

Hardness measurements across the bond were taken. Vickers (500 g) microhardness measurements were performed at intervals marked in FIG. 11D. The measurements were taken through the bond in both the longitudinal (left to right from the base metal through the bond to the adjoining base metal) and transvers (top to bottom, across the bond material). The results are reported in Table 1 below and shown in FIG. 12.

TABLE 1

| Location | $HV_{500}$ | Converted Rockwell* |
|---|---|---|
| Longitudinal Through Weld | 218 | RB 96 |
| | 214 | 96 |
| | 227 | 98 |
| | 272 | RC 26 |
| | 261 | 24 |
| | 280 | 27 |
| | 265 | 25 |
| | 266 | 25 |
| | 224 | RB 97 |
| | 225 | 98 |
| Transverse Through Weld | 275 | RC 26 |
| | 273 | 26 |
| | 277 | 27 |
| | 274 | 26 |
| | 277 | 27 |
| | 274 | 26 |
| | 273 | 26 |
| | 281 | 27 |
| | 278 | 27 |
| | 276 | 27 |
| Microstructure | Completely spheroidized annealed | |

The hardness and microstructure of the base metal was also examined. The bar stock sample was prepared longitudinally through the centerline. Vickers (500 g) microhardness tests were performed at three locations (near upper surface, center and near lower surface). The results are reported in Table 2.

TABLE 2

| Location | $HV_{500}$ | Converted Rockwell* |
|---|---|---|
| Near Surface | 240 | RB 100 |
| Core | 215 | 96 |
| Near Surface | 234 | 99 |
| Microstructure | Completely spheroidized annealed | |

*Conversions per ASTM E140-12b, Table 2.

Thus, the bond area is slightly harder than the base material, but the microstructure is the same. Example 2.

The bond area is very strong and failure of the metal piece was shown to occur away from bond line when subjected to tensile and bending stresses.

Tensile Test.

Figure 13A:
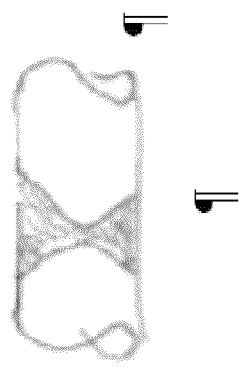
FIGS. 13A and 13B are line drawings and photograph, respectively, showing the hourglass shape of the bond area according to one or more embodiments.
Figure 13B:
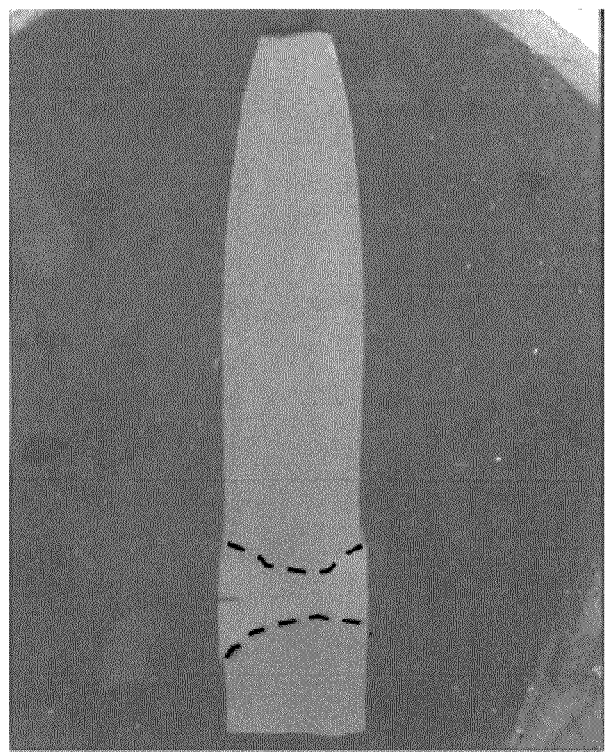

A 0.201"diameter ACB III high speed steel was subjected to two upsets made at 1200° F. and applying 8000 pounds of upset force to provide a bonded area. To test the bond strength, after only two upsets, the sample was subjected to hot tensile deformation to failure at 1300° F. and 1400° F. Visual inspection of the bond area after failure revealed several crack formation at the bond, which is an indication that bond formation was not perfect at 2 upsets. However, even when the bond is imperfect, as in this example, failure did not occur at the bond. Rather the workpiece showed necking and fracture a short distance from the bond location. To the naked eye, the bond area appears as an hour glass area. See, FIGS. 13

A and 13B, in which the hourglass region is denoted by dashed lines. The hourglass shape is the results of the grain structure difference, which in wire or other rolled or drawn metals, having been elongated along the axis of the wire is then turned 90 degrees by the upset at the joint interface. The haze area is where the metal is worked the most and where its' hardness is increased. This area, being slightly worked, is stronger in a tensile or bend fracture than it is outside the bond zone.

Bend Test.

Two ABC III steel wires were warm bonded using three upset stages at 1200° F. under conditions to provide a complete bond across the cross section of the metal pieces The warm bonded sample was then bent a room temperature into a hairpin bend and when opened, the wire fractures at a location adjacent to the bond line.

These examples demonstrate that the bond area is stronger than the base metal. The bond area is a few points harder due to work hardening than the wire bulk. Thus the metal piece fractures adjacent to but not in the work hardened area.

Example 3

Samples were subjected to a hot hammer test.

0.205" diameter ABCIII high speed steel wire was warm bonded using a three upset, 1200° F. process. In a post weld experiment, the sample was heated to approx. 1400° F. and hammered flat to a thickness of approx. .110" and width of 0.280". The sample did not fracture or fail and instead demonstrated compressive superplasticity as expected of a hammer and anvil worked metal A comparison sample of 0.201" ABCIII high speed steel wire that had been flash butt-welded using an industry standard flash butt weld machine was also hot hammered at approx. 1400° F. to a thickness of 0.10" and width of 0.221". The resultant weld area cracked as a result.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

The invention claimed is:

1. A method of solid phase bonding metal pieces comprising:
    (a) securing a first edge of a first metal piece and a second edge of a second metal piece in edge to edge contact, wherein first and second metal pieces are secured at locations spaced a first distance from the metal piece edges and wherein the first metal piece and the second metal piece comprise surface impurities;
    (b) subjecting the first and second metal pieces to a first upset comprising heating the abutting first and second edges while the first and second metal pieces are stationary with respect to one another, the first and second edges heated to a first temperature in the range of 0.35-0.95 of the melting temperature of the first and second metal pieces and applying a first axial force to the first and second metal pieces to urge the first and second edges together, to upset the metal at the edge to edge contact and form a bond;
    (c) resecuring the bonded metal piece at locations spaced a second distance on either side of the bond; and
    (d) subjecting the bonded metal piece to a second upset comprising heating the bonded metal piece between secured locations to a second temperature in the range of 0.35-0.95 of the melting temperature of the metal and applying a second axial force to the bonded metal piece to upset the bonded metal piece and form a solid phase bond free of surface impurities.

2. The method of claim 1, wherein the upset of step (d) is repeated one or more times.

3. The method of claim 1, wherein the upset of step (d) is repeated one to six times.

4. The method of claim 1, wherein the upset of step (d) is repeated one or two times.

5. The method of claim 1, wherein the metal is a ferrous alloy or a nickel alloy or a titanium alloy.

6. The method of claim 5, wherein the metal is a ferrous alloy and one or both of the first and second temperatures are less than a transformation temperature on the iron-carbon diagram.

7. The method of claim 6, wherein the temperature is less than the temperature for formation of austenite.

8. The method of claim 5, wherein the ferrous alloys are selected from the group of low carbon steel, medium carbon steel, high carbon steel, high alloy steels, stainless steel and tool steel.

9. The method of claim 1, wherein one or both of the first and second spaced distances are between 1-3 times, or 1-2 times, or about 1.5 times or 1.5 times the metal piece thickness or diameter.

10. The method of claim 9, wherein the axial forces reduce one or both of the first and second spaced distances are by a factor of more than 1, or a factor of 2, or a factor of 3, or a factor of 4, or a factor of 5 or a factor of about 1-10.

11. The method of claim 1, wherein the abutting first and second metal pieces are heated by resistance heat, by hot gases, or laser heating.

12. The method of claim 1, wherein the first and second metal pieces are secured using die pairs.

13. The method of claim 12, wherein applying an axial force comprises moving the die pairs from a first position spaced apart position towards each other to a second position.

14. The method of claim 12, wherein the die pairs are made of tungsten carbide or high temperature steel.

15. The method of claim 12, wherein the abutting first and second metal pieces are heated by heating the die pairs.

16. The method of claim 12, wherein the die pairs comprise a conductive path for a direct current electrical resistance heating circuit.

17. The method of claim 1, wherein the axial force is applied using hydraulic cylinders operably connected to move the die pairs into and out of engagement.

18. The method of claim 1, wherein the metal edges are coated with an indicator element or protective coating before bonding.

19. The method of claim 18, wherein coating is a liquid or gas flux or solder.

20. The method of claim 1, wherein the metals are the same or different.

21. The method of claim 1, wherein the metals edges are of the same size and/or shape or different size and/or shape.

22. The method of claim 1, further comprising rolling or die drawing the solid phase bonded metal piece, wherein the metal piece undergoes thickness reduction without cracking or bond failure.

23. The method of claim 1, further comprising incorporating the solid phase bonded metal piece into a saw blade.

24. The method of claim 1, further comprising incorporating the solid phase bonded metal piece into a weight bearing cable without failure.

25. The method of claim 1, wherein the solid phase bond free of a heat affected zone.

26. The method of claim 1, wherein the solid phase bond is uniform throughout the bond.

* * * * *